United States Patent Office 3,475,390
Patented Oct. 28, 1969

3,475,390
N-NITROSOPHENYLHYDROXYLAMINE AS SHORT STOPPING AGENTS FOR REDOX POLYMERIZATIONS
Kornelius Dinbergs, North Royalton, and John A. Yanko, Brecksville, Ohio, assignors to The B. F. Goodrich Company, New York, N.Y., a corporation of New York
No Drawing. Filed Oct. 6, 1966, Ser. No. 584,682
Int. Cl. C08f 1/80
U.S. Cl. 260—80.7      8 Claims

ABSTRACT OF THE DISCLOSURE

N-nitrosophenylhydroxylamine and water-soluble salts thereof are useful shortstopping agents for polymerizations of carboxyl-containing monomers conducted with a redox catalyst in aqueous emulsion.

---

This invention relates to an improvement in the process for interpolymerizing unsaturated carboxyl-containing monomers in aqueous emulsions. More particularly, the invention relates to an improved method for terminating redox polymerizations of carboxyl-containing monomers with N-nitrosophenylhydroxylamine.

Polymerizable unsaturated monomers containing carboxyl groups such as methacrylic acid are copolymerized and interpolymerized with other polymerizable monomers having a terminal $CH_2=C<$ group by emulsion polymerizations with redox catalyst systems in acidic media, since at a pH greater than 7 the acid salts are formed, which in many instances do not polymerize or, at best, polymerize very slowly. These polymerizations conducted on the acid side are quite rapid and it is essential that adequate means be available to terminate these polymerizations when the polymer having the desired properties is obtained. Inability to stop the polymerization at the desired time results in polymers which fail to meet specifications, often have undesirable properties and result in poor reproducibility. Consequently, a great deal of effort has been devoted to finding new and better shortstopping agents for such polymerization reactions.

Known shortstopping agents, while useful to a limited extent in various polymerization systems, all have serious drawbacks and are not satisfactory when used to terminate acid-side polymerizations of methacrylic acid and other carboxyl-containing monomers with redox catalysts. For example, a commercial shortstop, Goodrite 3955 (a mixture of sodium polysulfide and sodium dimethyldithiocarbamate), is partially effective, but only with large amounts which creates handling difficulties and residual shortstop in the polymer which influences the rate of cure of the polymer so that close control of vulcanization of finished products is often difficult. Other well-known shortstopping agents, such as hydroquinone, hydroxylamine, hydroxylamine sulfate, diethyl hydroxylamine, sodium diethyldithiocarbamate, are ineffective as shortstops for acid-side emulsion polymerizations in these systems.

We have now found that N-nitrosophenylhydroxylamine is an excellent shortstopping agent for polymerization of carboxyl-containing monomers conducted below pH 7 in a redox polymerization catalyst system, and that the processability, vulcanization rate and ultimate physical properties of the polymers obtained thereby are not adversely affected. The superior shortstopping ability of the N-nitrosophenylhydroxylamine in these systems was indeed quite unexpected in view of our previous unsuccessful attempts to shortstop with other N-nitroso compounds, hydroxylamine and hydroxylamine sulfate.

The N-nitrosophenylhydroxylamine may be used as such, or is conveniently added to the rubber latices as water-soluble salts, since the free N-nitrosophenylhydroxylamine may be unstable under certain conditions. Particularly useful are ammonium and alkali metal salts since they are readily soluble in water and, upon addition to the latex having a pH below 7, liberate the free N-nitrosophenylhydroxylamine.

The shortstopping agents of this invention are applicable to polymerizations of unsaturated carboxyl-containing monomers which are generally polymerized at a pH below 7 to avoid the formation of the corresponding salts. Particularly they are useful for methacrylic acid polymerizations carried out in a sulfoxylate recipe at a pH of about 3 to 4. In addition to being an effective shortstopping agent for polymerizations of methacrylic acid, the N-nitrosophenylhydroxylamine can be used to shortstop polymerizations with other carboxyl-containing monomers.

Such polymerizable carboxyl-containing monomers include acrylic acid, α-chloro acrylic acid, α-cyano acrylic acid, crotonic acid, β-acryloxy propionic acid, hydrosorbic acid, sorbic acid, α-chloro sorbic acid, cinnamic acid, β-styryl acrylic acid, hydromuconic acid, itaconic acid, citraconic acid, mesaconic acid, muconic acid, glutaconic acid, aconitic acid and similar monomers containing terminal methylene groups or carbon-carbon double bond in the alpha-beta position with respect to the carboxyl group.

Other polymerizable comonomers which contain a terminal $CH_2=C<$ group may be effectively polymerized with methacrylic acid or other carboxyl-containing monomers. Exemplary of such comonomers are: aliphatic conjugated diolefins such as butadiene, dimethyl butadiene, ethyl butadiene, isoprene, chloroprene, piperylene and the like; aryl olefins such as styrene, chlorostyrene and the like; acrylic and methacrylic acid derivatives such as acrylonitrile, ethyl acrylate, 2-ethylhexyl acrylate, methacrylonitrile, methyl methacrylate, methacrylamide, ethyl ethacrylate; vinyl compounds such as vinyl chloride, vinylidene chloride, vinyl acetate, vinyl pyridene, vinyl cyclohexene, methyl vinyl ketone, methyl vinyl ether and the like.

Particularly useful monomer systems of this invention include butadiene/methacrylic acid, butadiene/methyl methacrylate/methacrylic acid, butadiene/styrene/methacrylic acid, butadiene/styrene/crotonic acid, isoprene/acrylic acid and chloroprene/acrylic acid. The methacrylic acid and/or other carboxyl-containing monomer are present in the polymer in amounts not greater than about 50% by weight, and more preferably the carboxyl-containing monomers comprise from about 0.1 to about 15% by weight of the polymer composition.

The shortstopping agents of this invention are effective in any of the well-known emulsion polymerization recipes which employ a redox catalyst, that is, a catalyst-activator system employing both an oxidizing and a reducing agent capable of reacting to form free radicals at moderate temperatures and which generally contain an activator such as sodium sulfite, sodium bisulfite, sodium metabisulfite, sodium formaldehyde sulfoxylate and the like. Any of the conventional oxidizing agents or reducing agents may be used, and it is not necessary that the oxidant and reductant be in the same phase, in fact, in some systems it may be advantageous to have the oxidant in one phase and the reductant in another. Typical oxidants used are: peroxides and hydroperoxides such as hydrogen peroxide, benzoyl peroxide, cumene hydroperoxide, diisopropyl benzene hydroperoxide, p-menthane hydroperoxide and the like, persulfates, percarbonates, perborates, chlorates and the like. Reductants are typically heavy metal complexes, preferably complexes of ferrous iron such as, for example, complexes based on salicylic acid, citric acid or tartaric acid, chelates with bipyridine, o-phenanthroline, ethylenediamine tetraacetic acid or ethylene dinitrilotetraacetic acid, ferrous pyrophosphate, ferrous sulfide, ferrous silicate and the like, and combinations thereof.

The amount of ammonium or alkali metal salt of N-nitrosophenylhydroxylamine required to terminate the polymerization will generally be between about 0.01 and about 2.0 parts per hundred parts monomer, and more generally between about 0.05 and 0.80 part per hundred parts monomer. The amount of shortstop required is dependent primarily on the monomers and the particular redox catalyst system used, and may be varied accordingly.

The N-nitrosophenylhydroxylamine shortstops of this invention are equally effective for and may be readily adapted to both batch and continuous polymerization processes and can be added to the system when the desired molecular weight polymer is achieved. They may be added in their solid form, since they are soluble in the latex, or they may be dissolved in water or any other solvent which when added to the latex will not coagulate the polymer, and added to the polymerization mixture in solution. In either case, however, care should be taken to keep the ammonium and alkali metal salts of N-nitrosophenylhydroxylamine from undue contact with heat prior to use. The shortstops are also effective in systems which are vented prior to coagulation of the latex. Difficulties often arise if such vented systems are inadequately shortstopped, since volatile monomers escape upon standing for any length of time leaving the latex rich in other less-volatile monomers.

The following examples serve to illustrate the invention more fully, however, they are not intended to limit the scope thereof. All parts and percentages are by weight unless otherwise indicated.

EXAMPLE I

To illustrate the shortstopping ability of ammonium N-nitrosophenylhydroxylamine, butadiene, methyl methacrylate and methacrylic acid were terpolymerized. The polymerization recipe was as follows:

| | Parts by weight |
|---|---|
| Butadiene | 70 |
| Methyl methacrylate | 28 |
| Methacrylic acid | 2 |
| Distilled water | 200 |
| Modifier (tertiary dodecyl mercaptan) | 0.20 |
| Dispersant (polymeric short chain alkyl sodium naphthalene sulfonate) | 1.0 |
| Emulsifier (alkyl benzene sulfonate) | 3.0 |
| Activators (iron sequestrant) | 0.030 |
| (sodium formaldehyde sulfoxylate) | 0.1 |
| Complexing agents (tetrasodium salt of ethylenediamine tetraacetic acid) | 0.030 |
| (sodium hexahydroxyheptonate .2H$_2$O) | 0.015 |
| Na$_2$S$_2$O$_5$ | 0.02 |
| Initiator (p-menthane hydroperoxide) | 0.1 |
| Inert solvent for p-menthane hydroperoxide | 0.1 |

Quart beverage bottles charged in accordance with the above recipe were tumbled in a water bath maintained at 5° C. The latex had a pH below 7. When about 60% conversion of the monomers was achieved, the polymeriza-

TABLE I

| | Concentration Used* | Percent Conversion | | | | | |
|---|---|---|---|---|---|---|---|
| | | When Stopped | After 7 hrs. | After 31 hrs. | After 55 hrs. | After 79 hrs. | After 151 hrs. |
| Run Number: | | | | | | | |
| 1 | 0.15 | 61.3 | 61.3 | 61.5 | 61.5 | | 60.9 |
| 2 | 0.20 | | 59.5 | 60.0 | 50.3 | 59.4 | 59.6 |
| 3 | 0.40 | 59.0 | 58.6 | 58.8 | 58.5 | 58.9 | 58.9 |
| 4 | 0.60 | 59.1 | 59.6 | 59.7 | 59.6 | 59.9 | 59.4 |

*Parts per hundred parts monomers.

tions were shortstopped and the percent conversion determined at that point and at fixed intervals thereafter while maintaining the temperature of the latex at 50° C. Total solids were determined by drying a known weight of the rubber latex to a constant weight in a 115° C. vacuum oven and the percent conversion was obtained from the equation:

$$\frac{\text{Percent Latex Total Solids} - \text{Percent Non-Polymer Solids}}{\text{Percent Monomers in Recipe}} = \text{Percent Conversion}$$

Table I sets forth the results obtained when ammonium N-nitrosophenylhydroxylamine shortstop was used with butadiene, methyl methacrylate, methacrylic acid in the sulfoxylate recipe.

It is evident from Table I that the N-nitrosophenylhydroxylamine, when added to the latex as the ammonium salt, effectively terminates the polymerization of butadiene, methyl methacrylate and methacrylic acid in the sulfoxylate recipe. Even with as little as 0.15 part ammonium N-nitrosophenylhydroxylamine, there is no noticeable increase in monomer conversion after six days.

When a combination of sodium polysulfide and sodium dimethyldithiocarbamate (Goodrite 3955) was used to shortstop a similar polymerization, at shortstop levels up to about 0.6 part per hundred parts monomers, the percent conversions continued to increase over 151 hours at 50° C.

EXAMPLE II

Using the recipe as described in Example I, butadiene and methyl methacrylate were terpolymerized with varying amounts of methacrylic acid and shortstopped with 0.20 part ammonium N-nitrosophenylhydroxylamine per hundred parts monomers. Data for these polymerizations are set forth in Table II.

TABLE II

| | Monomer Composition | | | | Percent Conversion |
|---|---|---|---|---|---|
| | Butadiene | Methyl Methacrylate | Methacrylic Acid | When Stopped | |
| Run Number: | | | | | |
| 1 | 70 | 29.5 | 0.5 | 60.7 | 59.4 after 5 hrs. (50° C.)<br>59.5 after 10 hrs. (50° C.)<br>59.6 after 82 hrs. (50° C.)<br>59.5 after 106 hrs. (50° C.) |
| 2 | 70 | 29.0 | 1.0 | 59.5 | 59.4 after 7 hrs. (50° C.)<br>59.8 after 12 hrs. (50° C.)<br>59.3 after 84 hrs. (50° C.)<br>59.2 after 108 hrs. (50° C.) |
| 3 | 70 | 27.0 | 3.0 | 61.4 | 62.2 after 8 hrs. (50° C.)<br>61.4 after 13 hrs. (50° C.)<br>61.1 after 85 hrs. (50° C.)<br>61.4 after 109 hrs. (50° C.) |
| 4 | 70 | 25.0 | 5.0 | 58.3 | 59.7 after 9 hrs. (50° C.)<br>60.0 after 14 hrs. (50° C.)<br>60.0 after 86 hrs. (50° C.)<br>59.8 after 110 hrs. (50° C.) |

As Table II illustrates, when varying amounts of methacrylic acid are terpolymerized with butadiene and methyl methacrylate, the terpolymerizations are terminated by the addition of a small amount of ammonium N-nitrosophenylhydroxylamine to the latex. At methacrylic acid levels up to 5 parts, the N-nitrosophenylhydroxylamine was an effective shortstop. Polymerizations at even higher methacrylic acid levels, up to about 15 parts, were similarly stopped with these shortstops.

EXAMPLE III

Using the procedure previously described, 70 parts butadiene, 29 parts styrene and 1 part methacrylic acid were polymerized at 5° C. in accordance with the recipe of Example I except that 0.04 part $Na_2S_2O_5$ was used instead of 0.02 part. The polymerization was shortstopped with 0.15 part ammonium N-nitrosophenylhydroxylamine after 60.4% conversion had been achieved. The polymerization bottles were transferred to a 50° C. bath and the monomer conversion measured after 8, 13, 85 and 109 hours. Percent conversions were 59.4, 60.2, 60.0 and 59.7 respectively.

The copolymerization of butadiene and methacrylic acid was similarly shortstopped with N-nitrosophenylhydroxylamine. When Example I was repeated, using acrylic acid instead of methacrylic acid, the N-nitrosophenylhydroxylamine was equally effective to terminate the polymerization.

Properties of polymers obtained by shortstopping with N-nitrosophenylhydroxylamine are not adversely affected. The polymers are compatible with typical compounding ingredients and the effectiveness of accelerators, curing agents, antioxidants, antiozonants and the like, which are used in the polymer product is not changed significantly. Also, the vulcanization rate and aging characteristics of polymers obtained is not unduly influenced.

We claim:

1. A process for terminating polymerizations of carboxyl-containing monomers containing terminal methylene groups or a carbon-carbon double bond alpha to the carboxyl group in an aqueous emulsion at a pH below 7 in the presence of a redox catalyst with about 0.01 to 2.0 parts per 100 parts total monomers of a compound selected from the group consisting of N-nitrosophenylhydroxylamine or a water soluble salt of N-nitrosophenylhydroxylamine.

2. The process of claim 1 wherein the water-soluble salt is ammonium N-nitrosophenylhydroxylamine or an alkali metal salt of N-nitrosophenylhydroxylamine.

3. The process of claim 2 wherein the ammonium or alkali metal salt of N-nitrosophenylhydroxylamine added is in the range between about 0.05 and 0.80 part per hundred parts monomers.

4. The process of claim 1 wherein a monomer mixture of the carboxyl-containing monomer, present in an amount not exceeding 50% by weight, and at least one other polymerizable monomer containing a terminal $CH_2=C<$ group is polymerized.

5. The process of claim 4 wherein the carboxyl-containing monomer is present in an amount between about 0.1 and 15% by weight of the monomer mixture.

6. The process of claim 4 wherein the carboxyl-containing polymer is methacrylic acid.

7. The process of claim 6 wherein the monomer mixture contains methacrylic acid, methyl methacrylate and butadiene.

8. The process of claim 6 wherein the monomer mixture contains methacrylic acid, butadiene and styrene.

References Cited

UNITED STATES PATENTS

| | | | |
|---|---|---|---|
| 3,148,225 | 9/1964 | Albert | 260—669 |
| 3,222,334 | 12/1965 | Demme | 260—84.7 |
| 3,371,124 | 2/1968 | Albert | 260—666.5 |

FOREIGN PATENTS

| | | |
|---|---|---|
| 150,550 | 9/1963 | Hungary. |
| 6,511,747 | 3/1966 | Netherlands. |

JOSEPH L. SCHOFER, Primary Examiner

J. C. HAIGHT, Assistant Examiner

U.S. Cl. X.R.

260—85.7, 86.1, 86.3, 87.5, 87.7, 88.1